R. G. DAYTON.
Improvement in Potato-Diggers.

No. 132,814.  Patented Nov. 5, 1872.

Witnesses:
A. W. Almquist
C. Sedgwick

Inventor:
R. G. Dayton
per
Attorneys.

UNITED STATES PATENT OFFICE.

ROBERT G. DAYTON, OF NORTH GRANVILLE, NEW YORK.

IMPROVEMENT IN POTATO-DIGGERS.

Specification forming part of Letters Patent No. 132,814, dated November 5, 1872.

*To all whom it may concern:*

Figure 1:
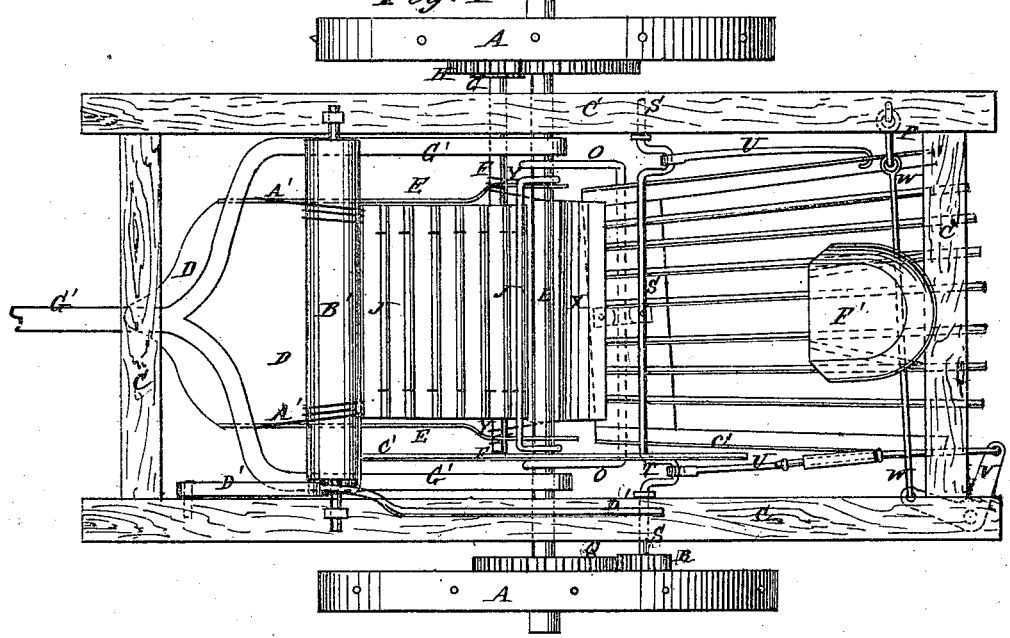
Figure 2:
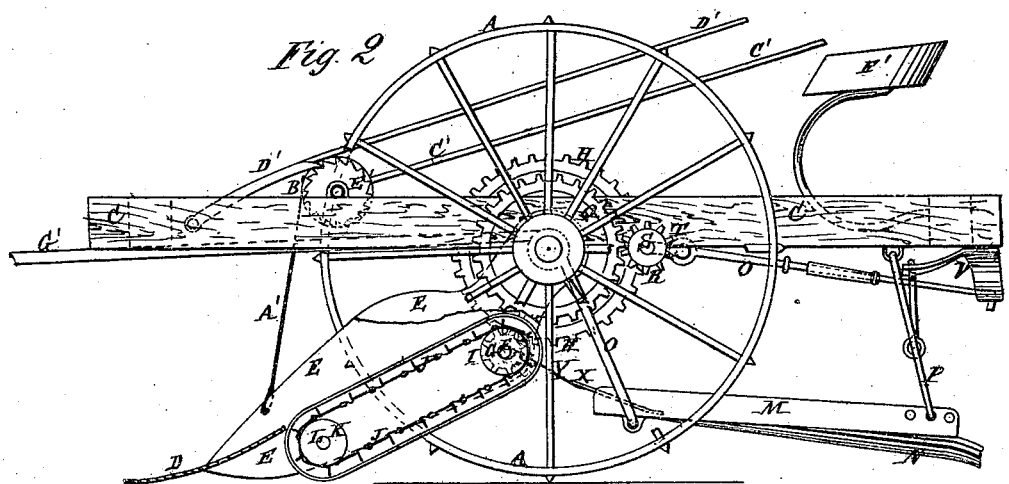
Figure 3:
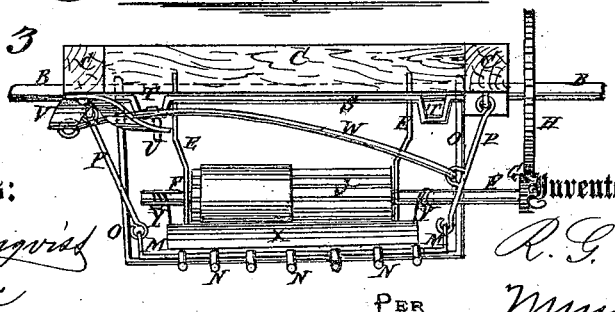

Be it known that I, ROBERT G. DAYTON, of North Granville, in the county of Washington and State of New York, have invented a new and useful Improvement in Potato-Digger, of which the following is a specification:

Figure 1 is a top view of my improved machine; Fig. 2 is a side view of the same, part being broken away to show the construction; and Fig. 3 is a rear view of the same.

Similar letters of reference indicate corresponding parts.

My invention has for its object to furnish an improved potato-digger simple in construction, convenient in use, effective in operation, and easily controlled; and it consists in the construction and combination of various parts of the machine, as hereinafter more fully described.

A are the wheels, which revolve upon the journals of the axle B. C is the frame, the side bars of which are secured to the axle B. D is the scoop, which is made in about the shape shown in Figs. 1 and 2. The side flanges E of the scoop D project to the rearward and upward, and have holes or notches formed in them to receive the axle B, so that the draft strain upon the said scoop D may be supported by the said axle B. In the lower rear parts of the flanges E are formed holes, in which works the shaft F, to one end of which is attached a small gear-wheel, G, the teeth of which mesh into the teeth of a larger gear-wheel, H, attached to one of the wheels A. To the shaft F between the flanges E are attached spur or chain-wheels I, around which passes the endless carrier J, which also passes around the spur or chain-wheels K attached to a shaft, L, that revolves in bearings in the lower forward parts of the scoop-flanges E a little below and in the rear of the rear edge of the scoop D. The carrier J is formed of slats hinged to each other at their edges, and having flanges formed upon their lower edges to carry up the soil and potatoes more surely. In some cases it may be desirable to attach the flanged slats to the outer side of an endless rubber band, in which case similar slats, but without the flanges, should be attached to the under side of said band, the outer and inner slats being placed directly opposite each other, and secured to each other and to the rubber band by bolts. From the carrier J the potatoes and soil fall upon the shaker M N, through which the soil passes, and from the rear end of which the potatoes fall to the ground. M is the frame of the shaker, consisting of two side bars flanged along their outer edges, and connected at their forward ends by a cross-bar. N are slats or rods placed parallel with each other and with the side bars of the frame M. The forward ends of the rods N are attached to the front cross-bar of the frame M, and are supported in a horizontal position by a plate or bar placed near said cross-bar, and the ends of which are secured to the side bars of the said frame M. The middle and rear parts of the rods N are entirely unsupported, so that the potatoes may encounter no obstruction in moving along the shaker. The forward end of the shaker M N is supported by a bail, O, the middle part of which passes beneath and is pivoted to the lower side of the forward end of said shaker. The end parts of the bail O are bent upward at right angles, and have hooks formed upon their ends to hook over the axle B. The rear ends of the shaker M N are supported by rods P, the upper ends of which are pivoted to the rear parts of the side bars of the frame C, and the lower ends of which are pivoted to the rear parts of the side bars of the shaker-frame M. To one of the wheels A is attached a gear-wheel, Q, the teeth of which mesh into the teeth of the small gear-wheel R attached to the end of the shaft S, which revolves in bearings attached to the side bars of the frame C. Upon the shaft S is formed a crank, T, to which is pivoted the forward end of the rod U, the rear end of which is pivoted to the rear part of the side bar of the shaker-frame M. By this construction, as the machine is drawn forward the shaker will be shaken longitudinally. If desired, a second crank, T, and rod U may be used. In some soils it may be necessary to shake the shaker laterally, in which case the rear end of the rod U is detached from the rear part of the side bar of the frame M and is attached to the end of one arm of the bent lever V, which is pivoted at its angle to the rear part of the side bar of the frame C. To the end of the other arm of the bent lever V is pivoted one end of the rod W, which passes across the rear part of the machine, and its other end is pivoted to the rod P or to the side bar of the frame M. By this construction, as the machine is drawn forward the shaker will be shaken laterally. X is a plate or apron placed upon the forward part of the shaker M N in such a position as to receive the soil and potatoes from the carrier J. The apron X is held in position by rods Y, the lower ends of which are attached to the ends of the said apron, and the upper ends of which are connected with the carrier-shaft F, so as to keep the said apron always in the same position with respect to the rear end of the carrier J. To the forward lower parts of the scoop-flanges E are attached the lower ends of the chains or cords A', the upper ends of which are wound around and are attached to the roller B', the journals of which work in bearings attached to the side bars of the frame C. By this construction, by turning the roller B' the scoop D may be adjusted to work at any desired depth in the ground, or may be raised from the ground, when desired. The roller B' is turned by a lever, C', which extends back into such a position that it may be conveniently reached and operated by the driver from his seat. The roller B' is held in any position into which it may be turned by the lever-pawl D', which takes hold of a ratchet-wheel, E', formed upon or attached to the end of the said roller B'. The lever-pawl D' extends back into such a position that it may be conveniently reached and operated by the driver from his seat. F' is the driver's seat, which is attached to the rear part of the frame C, so that the driver's weight may counteract the downward pressure upon the horses' necks. G' is the tongue, which passes through a keeper attached to the front cross-bar of the frame C, and the rear end of which is branched and is attached to the axle B, so that the draft may be applied directly to the said axle.

Having thus described my invention, I claim as new and desire to secure by Letters Patent—

The combination of the apron X and rods Y with the shaker M N, carrier J, and shaft F, substantially as herein shown and described, and for the purpose set forth.

ROBERT G. DAYTON.

Witnesses:
GEO. B. CULVER,
R. J. DAYTON.